A. E. STAPLES.
COMPOUND WEEDING AND SCRAPING IMPLEMENT.
APPLICATION FILED OCT. 7, 1914.
1,153,721.
Patented Sept. 14, 1915.
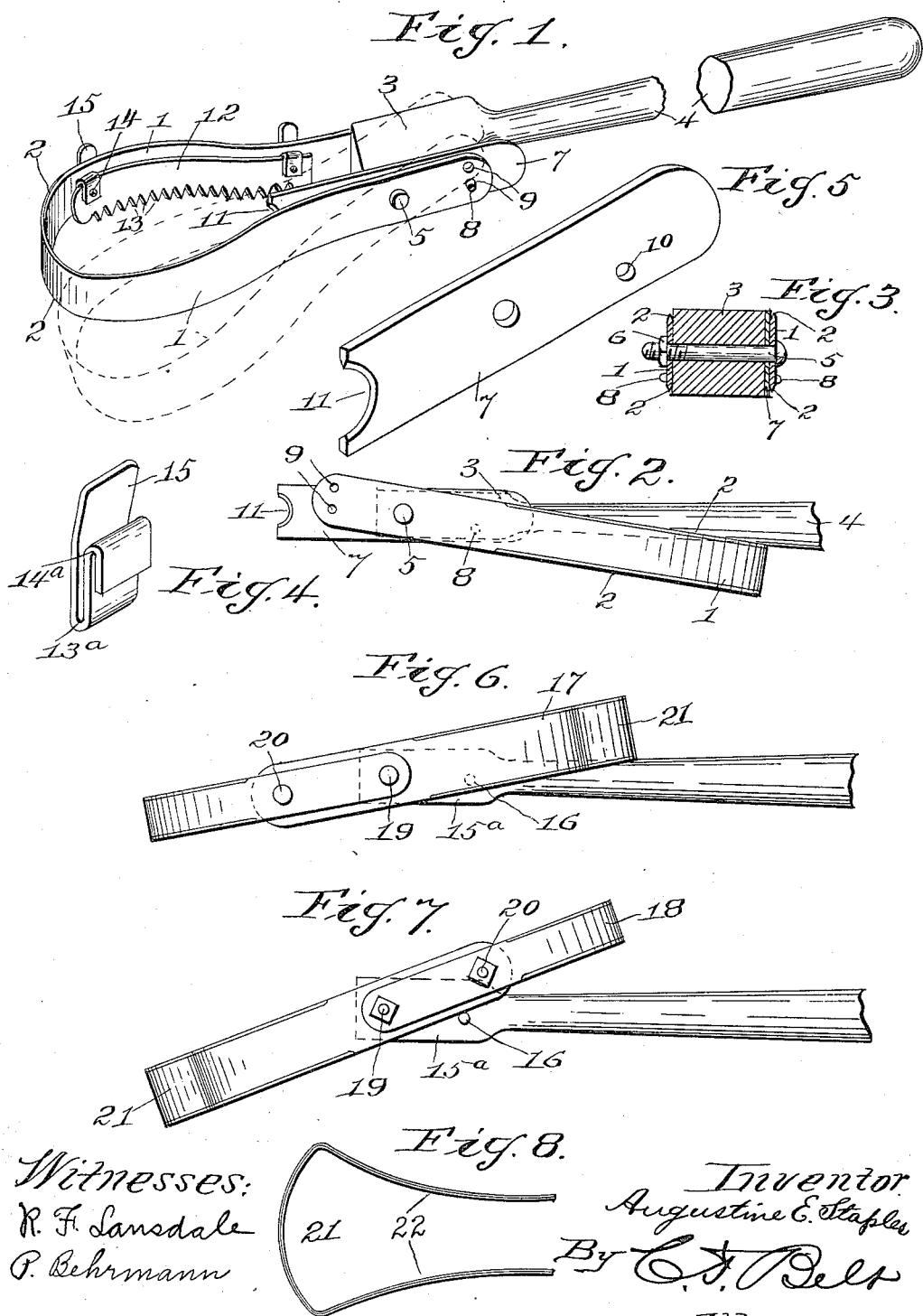
Witnesses:
R. F. Lansdale
P. Behrmann
Inventor
Augustine E. Staples
By C. J. Belt
Attorney.

UNITED STATES PATENT OFFICE.

AUGUSTINE E. STAPLES, OF CHESTER, VERMONT.

COMPOUND WEEDING AND SCRAPING IMPLEMENT.

1,153,721. Specification of Letters Patent. Patented Sept. 14, 1915.

Application filed October 7, 1914. Serial No. 865,501.

*To all whom it may concern:*

Be it known that I, AUGUSTINE E. STAPLES, a citizen of the United States, residing at Chester, in the county of Windsor and State of Vermont, have invented certain new and useful Improvements in Compound Weeding and Scraping Implements, of which the following is a specification.

This invention relates to weeding implements, and pertains especially to a compound implement having adjustable blades operated by one and the same handle.

The object of the invention is to provide in one and the same implement a looped weeder, a weeding blade, and a blade for carding and scraping purposes.

A further object of the invention is to provide a handle head with special means for attaching the looped weeder and the weeding blade so as to permit the loop to be swung to various angles relative to the blade and to the handle head by merely compressing the loop and pushing or pulling the same on its pivot into desired position where it is held by said special means.

A still further object of the invention is to provide the loop with a toothed blade for scraping trees and plants, and for carding animals, and to furnish the toothed blade with novel and peculiar spring clamping hangers.

Various other objects and purposes may be found for the combination implement in the practical application thereof.

In the accompanying drawings forming part of this application:—Figure 1 is a perspective view of the combination implement. Fig. 2 is a side elevation showing the loop thrown back. Fig. 3 is a cross section. Fig. 4 is a perspective view of one of the clamps. Fig. 5 is a perspective view of the cutter. Fig. 6 is a side view of a modification. Fig. 7 is a similar view of the modification showing the loops in reversed position. Fig. 8 is an edge view of the cutting end of the large modified loop.

The same reference characters denote the same parts throughout the several views of the drawings.

The weeding loop 1, is composed of sheet steel having both edges 2 sharpened for cutting with either edge of the loop as desired or as occasion may demand. Each end of the loop is pivoted to a square head 3 of the handle 4, by means of a pivot bolt 5 extending through the head and having a suitable nut 6 for securing the loop ends and a cutter or weeding blade 7 to the head. The head 3 is provided with a pin or locking stud 8 on opposite sides of the head, and said studs are off-set from the center of the head for engagement with one or the other of apertures 9 in the ends of the loop, and for engagement with an aperture 10 in the inner end of the weeding blade 7. The outer end of the blade 7 is concaved or has a semi-circular cut-out 11, provided with a knife edge. It will be observed that the aperture 10 of the blade 7 is off-set from the center and adjacent to one side edge of the blade for engaging one of the locking lugs so as to hold the blade straight upon the handle head, and so that the cutting end of the blade 7 projects from said head in weeding position.

The toothed blade 12 consists of a strip or piece of sheet steel having teeth 13 upon one edge thereof, and said blade is attachable to one side of the loop 1, by means of a pair of S-shaped clamping hangers clenched or riveted at 14 to the ends of the blade 12, and having a bent projection 15 overlapping the loop 13ª above the loop 14ª from which the toothed edge of the blade 12 projects. The blade 12 is applied to the inner side of the loop opposite the cutter 7 so as not to interfere with the cutter in adjusting and operating the blade 12 or the pivot movement of the loop. The blade 12 may be used for combing or carding animals, and for scraping lichen or tree moss from trees. The cutter 7 is used especially for cutting plantain or dandelion and the like, and as this cutter is fixed to the handle head and projects straight out therefrom, it affords means for certain weeding to which the loop is not particularly applicable.

In order to change the position or angle of the loop relative to the head, the outer portion of the loop is compressed thereby lifting the ends of the loop out of engagement with the locking lugs, so that the loop may be turned on its pivot and released for expansion to have any one of the loop apertures engage the locking lugs. The loop may be placed at a greater angle by having the loop ends over-ride the lugs so that the edge of said ends will engage the lugs.

It will be seen that the loop may be adjusted to various angles as desired for expeditious application of the weeder, that the loop may be thrown back upon the handle and out of interference with the cutter 7 when the latter is to be used, that one end of the loop supports the cutter, that either the cutter or the loop may be removed and replaced when the use of only one or the other thereof is desired, and that the toothed blade is attached by pressing or pushing the spring clamps over the loop.

In order to furnish loops of different size on the same handle as may be required in various weeding, I have provided a pair of reversible loops as shown in the modification, Figs. 6, 7 and 8 of the drawings, wherein the handle head 15$^a$ is the same shape as the head hereinbefore described and is provided with stop lugs 16. This implement comprises two weeding loops 17 and 18, which are pivoted to the head 15$^a$, by means of a pivot bolt 19, and the pivot ends of the loops over-lap and are secured together by means of a bolt 20, so that the loops extend in opposite directions from the pivot 19. The large loop 17 has a specially shaped front cutting end 21, and the side arms 22 of this loop are bowed outwardly so as not to engage the stop lugs 16, but the end 21 rests upon the handle when the smaller loop 18 is used. When the position of the loops are reversed the ends of the loop 17 rest against the lugs 16, and the head is reversed for weed cutting. The weeding position of the small loop is at a slight angle to the head, and the weeding position of the large loop is at a greater angle to the head.

This form of weeder is particularly applicable in weeding among small plants growing close together, as well as in weeding plants having a wider space therebetween. Obviously the loops and the head have only to be reversed for using one or the other of the loops.

The practical utility of this weeder enables the user to save time and to accomplish more weeding with less labor than usual. The different angles assumed by the loops greatly assist in a weeding operation, and the reversible feature of the loops facilitates the operation of the implement.

I do not wish to be understood as limiting the application of the invention, as it may be used for various purposes as may be found practical, nor do I wish to be understood as confining the invention to any particular size, material, or means for mounting the parts on the handle head, but reserve to myself the right to make such changes and variations therein as will come within the scope of the appended claims.

Having thus described my invention what I claim as new and desire to secure by Letters Patent is:—

1. In a weeding implement, a handle, a handle head, a pivot projecting from each side of the head, weed cutters connected with the head by said pivot, and locking lugs projecting from the pivot sides of the head, the pivot movement in one direction being stopped by the lugs and the pivot movement in the other direction being stopped by the handle.

2. A compound weeding implement comprising a handle head having a pair of locking lugs projecting from opposite sides thereof, a resilient weed cutting loop pivoted to the head and having apertures in the ends thereof for engaging the lugs, and a weed cutting blade held in projected position upon the head by said pivot and by one of said lugs, said projecting portion of the blade being supported by one end of the loop with the latter in folded position.

In witness whereof I hereunto set my hand in the presence of two witnesses.

AUGUSTINE E. STAPLES.

Witnesses:
HUGH HENRY,
HENRY CROCKER.

Copies of this patent may be obtained for five cents each, by addressing the "Commissioner of Patents, Washington, D. C."